US012639126B2

(12) United States Patent
Shatsky et al.

(10) Patent No.: US 12,639,126 B2
(45) Date of Patent: May 26, 2026

(54) LOAD DISTRIBUTION IN A DATA STORAGE SYSTEM

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 678 days.

(21) Appl. No.: 17/729,219

(22) Filed: Apr. 26, 2022

(65) Prior Publication Data

US 2023/0342212 A1     Oct. 26, 2023

(51) Int. Cl.
*G06F 9/50*          (2006.01)
(52) U.S. Cl.
CPC ............ *G06F 9/505* (2013.01); *G06F 9/5072* (2013.01)
(58) Field of Classification Search
CPC ............................... G06F 9/505; G06F 9/5072
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |

| | | |
|---|---|---|
| 9,372,751 B2 | 6/2016 | McNutt |
| 9,514,014 B2 | 12/2016 | Webman et al. |
| 9,892,045 B1 | 2/2018 | Douglis et al. |

(Continued)

FOREIGN PATENT DOCUMENTS

| | | |
|---|---|---|
| WO | 2015108670 A1 | 10/2020 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Aimee Li
*Assistant Examiner* — Harrison Li
(74) *Attorney, Agent, or Firm* — Ryan, Mason & Lewis, LLP

(57) ABSTRACT

Techniques are provided for managing load distribution in a data storage system which comprises storage server nodes and storage nodes, wherein each storage server node comprises one or more distribution targets, wherein each distribution target comprises a logical processing unit that is configured to manage input/output operations for accessing data in the storage nodes. A process for managing the load distribution comprises: partitioning a logical address space into a plurality of distribution items; mapping the logical address space to a sequence of one or more distribution templates, wherein each distribution template comprises an ordered list of the distribution targets of the storage server nodes, which is uniquely different for each of the one or more distribution templates; and utilizing the one or more distribution templates to map the distribution items of the logical address space to the distribution targets of the storage server nodes.

20 Claims, 7 Drawing Sheets

(56) References Cited

U.S. PATENT DOCUMENTS

| 10,078,598 | B1 | 9/2018 | Wallace et al. | |
|---|---|---|---|---|
| 10,331,561 | B1 | 6/2019 | Shilane et al. | |
| 10,445,180 | B2 | 10/2019 | Butterworth et al. | |
| 10,986,174 | B1 | 4/2021 | Sharma et al. | |
| 11,119,668 | B1 | 9/2021 | Keller et al. | |
| 11,144,399 | B1 | 10/2021 | Yarimi et al. | |
| 11,163,479 | B2 | 11/2021 | Lieblich et al. | |
| 11,163,699 | B2 | 11/2021 | Keller et al. | |
| 11,221,975 | B2 | 1/2022 | Puder et al. | |
| 11,262,933 | B2 | 3/2022 | Matosevich et al. | |
| 11,301,162 | B2 | 4/2022 | Matosevich et al. | |
| 11,307,935 | B2 | 4/2022 | Keller et al. | |
| 2002/0032835 | A1 | 3/2002 | Li et al. | |
| 2008/0021853 | A1 | 1/2008 | Modha et al. | |
| 2008/0244068 | A1* | 10/2008 | Iyoda | G06F 9/5083 |
| | | | | 709/224 |
| 2009/0204761 | A1 | 8/2009 | Caprioli et al. | |
| 2009/0276593 | A1 | 11/2009 | Jacobson et al. | |
| 2010/0235413 | A1* | 9/2010 | Patel | G06F 16/10 |
| | | | | 707/825 |
| 2010/0318712 | A1* | 12/2010 | Boldyrev | G06F 9/44573 |
| | | | | 710/308 |
| 2013/0305002 | A1 | 11/2013 | Hallak et al. | |
| 2014/0215147 | A1 | 7/2014 | Pan | |
| 2014/0215262 | A1 | 7/2014 | Li et al. | |
| 2014/0244935 | A1 | 8/2014 | Ezra et al. | |
| 2016/0103764 | A1 | 4/2016 | Banerjee et al. | |
| 2018/0113640 | A1 | 4/2018 | Fernandez et al. | |
| 2018/0267893 | A1 | 9/2018 | Barzik et al. | |
| 2018/0300075 | A1 | 10/2018 | Fernandez et al. | |
| 2019/0163587 | A1 | 5/2019 | Anna et al. | |
| 2019/0227845 | A1 | 7/2019 | Sridhar et al. | |
| 2020/0133503 | A1 | 4/2020 | Sun et al. | |
| 2021/0019284 | A1* | 1/2021 | Bowman | G06F 16/278 |
| 2021/0165691 | A1* | 6/2021 | Diril | G06F 9/544 |
| 2021/0279187 | A1 | 9/2021 | Puder et al. | |
| 2021/0294505 | A1 | 9/2021 | Keller et al. | |
| 2021/0294774 | A1 | 9/2021 | Keller et al. | |
| 2021/0294775 | A1 | 9/2021 | Keller et al. | |
| 2021/0303160 | A1 | 9/2021 | Lieblich et al. | |
| 2021/0303169 | A1 | 9/2021 | Tagar et al. | |
| 2021/0303202 | A1 | 9/2021 | Ben Zeev et al. | |
| 2021/0303401 | A1 | 9/2021 | Yarimi et al. | |
| 2021/0303407 | A1 | 9/2021 | Keller et al. | |
| 2021/0303480 | A1 | 9/2021 | Keller et al. | |
| 2021/0373796 | A1 | 12/2021 | Matosevich et al. | |
| 2022/0004320 | A1 | 1/2022 | Matosevich et al. | |
| 2022/0035788 | A1 | 2/2022 | Aharoni et al. | |
| 2022/0113867 | A1 | 4/2022 | Aharoni et al. | |
| 2022/0114184 | A1 | 4/2022 | Sharma et al. | |
| 2022/0116454 | A1 | 4/2022 | Aharoni et al. | |
| 2022/0121458 | A1 | 4/2022 | Moran et al. | |

OTHER PUBLICATIONS

International Search Report and Written Opinion of PCT/US2019/024900 dated Jan. 7, 2020, 12 pages.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Dell EMC, "Getting To Know Dell EMC PowerFlex, " Version 3.5.x, Rev. 02, Jan. 2021, 66 pages.
Dell EMC, "Dell EMC VxRack Flex," Dell EMC Product Overview, 2018, 5 pages.
G. Soundararajan et al., "Dynamic Resource Allocation for Database Servers Running on Virtual Storage," Fast 2009: Proceedings of the 7th conference on File and storage technologies, Feb. 2009, pp. 71-84.
R. Kanaga et al., "SELDAC: Software-Defined Storage based Efficient Load Distribution and Auto Scaling in Cloud Data Centers," Journal of Communications, vol. 10, No. 12, Dec. 2015, 7 pages.
U.S. Appl. No. 17/106,988 filed in the name of Rivka Matosevich et al. on Nov. 30, 2020, and entitled "Managing Host Connectivity to a Data Storage System.".
U.S. Appl. No. 17/123,525 filed in the name of Itay Keller et al. on Dec. 16, 2020, and entitled "Deferred Reclamation of Invalidated Entries Associated with Replication in a Log-Structured Array.".
U.S. Appl. No. 17/145,646 filed in the name of Yosef Shatsky et al. on Jan. 11, 2021, and entitled "Redistribution of Processing Groups between Server Nodes Based on Hardware Resource Utilization.".
U.S. Appl. No. 17/232,203 filed in the name of Roman Spiegelman on Apr. 16, 2021, and entitled "Object Synchronization of Server Nodes in a Network Computing Environment.".
U.S. Appl. No. 17/236,256 filed in the name of Doron Tal et al. on Apr. 21, 2021, and entitled "Recovery from Partial Device Error in Data Storage System.".
U.S. Appl. No. 17/306,601 filed in the name of Rivka Matosevich et al. on May 3, 2021, and entitled "Managing Replication Journal in a Distributed Replication System.".
U.S. Appl. No. 17/308,166 filed in the name of Adi Bar Shalom et al. on May 5, 2021, and entitled "Journal Barrier Consistency Determination.".
U.S. Appl. No. 17/351,733 filed in the name of Yosef Shatsky et al. on Jun. 18, 2021, and entitled "Data Deduplication in a Disaggregated Storage System.".
U.S. Appl. No. 17/361,666 filed in the name of Yosef Shatsky et al. on Jun. 29, 2021, and entitled "Tracking Utilization of Data Blocks in a Storage System.".
U.S. Appl. No. 17/511,695 filed in the name of Yosef Shatsky et al. on Oct. 27, 2021, and entitled "Write Cache Management.".
U.S. Appl. No. 17/511,699 filed in the name of Yosef Shatsky et al. on Oct. 27, 2021, and entitled "Metadata Management in Storage Systems.".
U.S. Appl. No. 17/512,890 filed in the name of Yosef Shatsky et al. on Oct. 28, 2021, and entitled "Utilizing Checkpoints for Resiliency of Metadata in Storage Systems.".
U.S. Appl. No. 17/569,198 filed in the name of Yosef Shatsky on Jan. 5, 2022, and entitled "Utilizing a Persistent Write Cache as a Redo Log.".
U.S. Appl. No. 17/583,365 filed in the name of Doron Tal et al. on Jan. 25, 2022, and entitled "Data Deduplication in a Storage System.".
U.S. Appl. No. 17/583,787 filed in the name of Michal Yarimi et al. on Jan. 25, 2022, and entitled "Intelligent Defragmentation in a Storage System.".

(56) References Cited

OTHER PUBLICATIONS

U.S. Appl. No. 17/077,105 filed in the name of Yosef Shatsky et al. on Oct. 22, 2020, and entitled "Volume Tiering in Storage Systems.".

* cited by examiner

100

400   RECEIVE DATA ACCESS REQUEST

401   DETERMINE DISTRIBUTION ITEMS ASSOCIATED WITH DATA ACCESS REQUEST

402   IDENTIFY ITEM GROUP CORRESPONDING TO THE DISTRIBUTION ITEMS

403   DETERMINE DISTRIBUTION TEMPLATE ID MAPPED TO IDENTIFIED ITEM GROUP

404   SEND DISTRIBUTION ITEMS TO DISTRIBUTION TARGETS ASSOCIATED WITH DISTRIBUTION TEMPLATE HAVING DETERMINED TEMPLATE ID

LOAD DISTRIBUTION IN A DATA STORAGE SYSTEM

FIELD

This disclosure relates generally to data storage management techniques and, more particularly, to techniques for managing load distribution in a data storage system.

BACKGROUND

A distributed storage system comprises a cluster of storage servers which is utilized to store user data in a distributed manner over all the storage servers to achieve load balancing and capacity balancing. In a distributed storage system, a load balancing system can be utilized to distribute a dynamic workload evenly across all storage servers to achieve a high resource utilization ratio, a short data access time, and high input/output (I/O) throughput. Disaggregated storage systems decouple load balancing from capacity balancing. In such architectures, the distribution of load balancing does not factor in, and is not limited by, the capacity of each node. Instead, load balancing is implemented to distribute a compute load associated with data storage (e.g., I/O processing) with the goal of maximizing the utilization of the storage compute resources in the storage system. While various techniques exist for managing load balancing in a storage system, such techniques can require significant overhead to perform load balancing operations and manage the requisite metadata, especially in scale-out storage systems when storage servers are added (or removed) from the storage system.

SUMMARY

Exemplary embodiments of the disclosure include techniques for managing load distribution in a data storage system which comprises storage server nodes and storage nodes, wherein each storage server node comprises one or more distribution targets, wherein each distribution target comprises a logical processing unit that is configured to manage I/O operations for accessing data in the storage nodes. In some embodiments, a process for managing the load distribution comprises: partitioning a logical address space into a plurality of distribution items; mapping the logical address space to a sequence of one or more distribution templates, wherein each distribution template comprises an ordered list of the distribution targets of the storage server nodes, which is uniquely different for each of the one or more distribution templates; and utilizing the one or more distribution templates to map the distribution items of the logical address space to the distribution targets of the storage server nodes.

Other embodiments of the disclosure include, without limitation, systems and articles of manufacture comprising processor-readable storage media, which are configured for managing load distribution in a data storage system.

DETAILED DESCRIPTION

Exemplary embodiments of the disclosure will now be discussed in further detail with regard to systems and methods for managing load distribution in a data storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
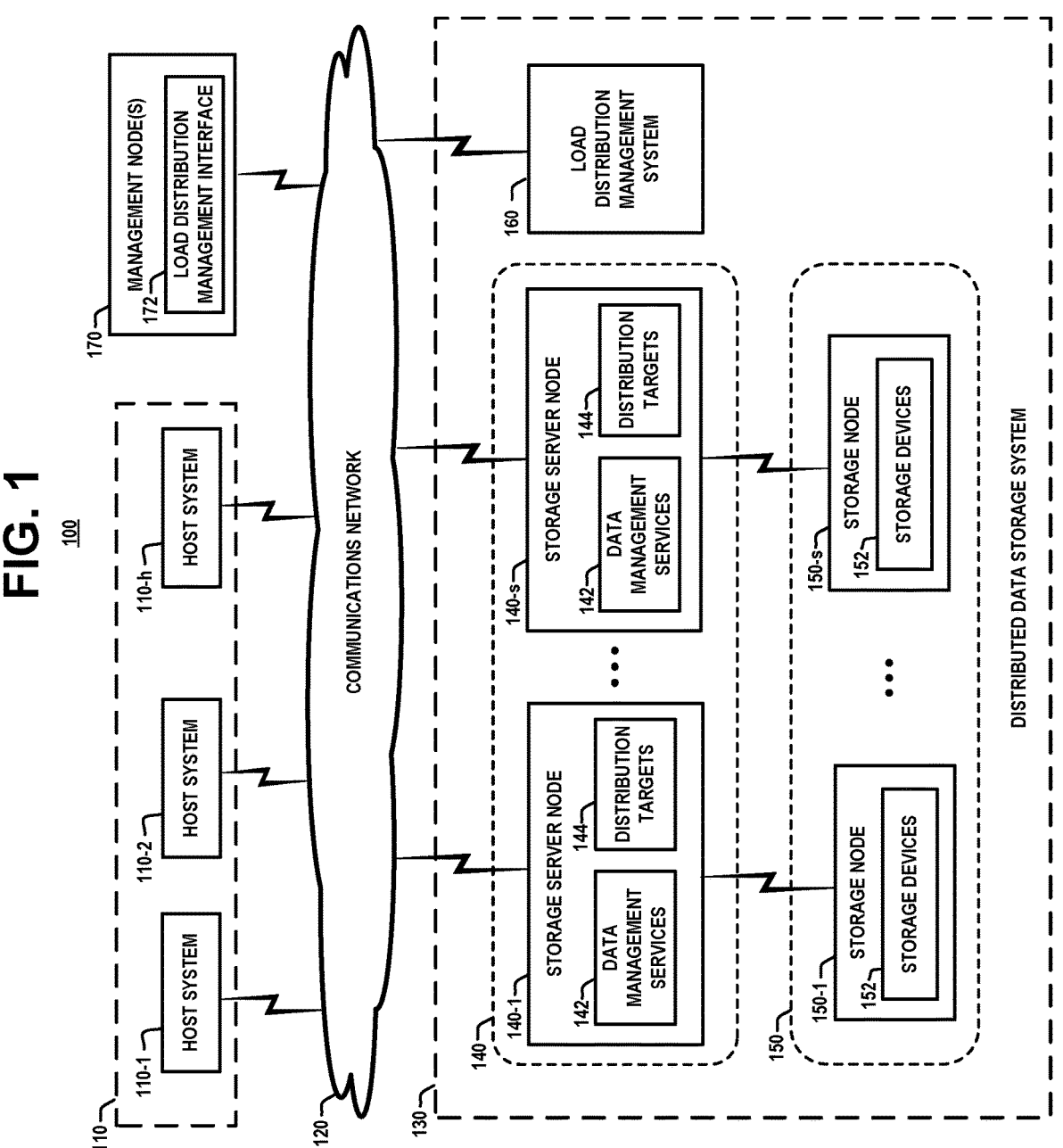
FIG. 1 schematically illustrates a network computing system comprising a storage system which is configured to manage load distribution using distribution templates, according to an exemplary embodiment of the disclosure.

FIG. 1 schematically illustrates a network computing system comprising a storage system which is configured to manage load distribution using distribution templates, according to an exemplary embodiment of the disclosure. In particular, FIG. 1 schematically illustrates a network computing system 100 which comprises one or more host systems 110-1, 110-2, . . . 110-h (collectively, host systems 110), a communications network 120, and a distributed data storage system 130 (e.g., a disaggregated data storage system). The distributed data storage system 130 comprises a plurality of storage server nodes 140-1, . . . , 140-s (collectively, storage server nodes 140), a plurality of storage nodes 150-1, . . . , 150-s (collectively, storage nodes 150), and a load distribution management system 160. The storage server nodes 140 implement respective data management services 142 and distribution targets 144. Each storage node 150-1, . . . , 150-s comprises an array of storage devices 152, wherein each array of storage devices 152 comprises an array of homogeneous or heterogeneous storage devices.

The network computing system 100 further comprises one or more management nodes 170 which implement application programming interfaces (APIs) to enable manual, automated, and/or semi-automated configuration, management, provisioning, and monitoring of the distributed data storage system 130 and the associated storage server nodes 140 and storage nodes 150, as well as accessing and configuring the load distribution management system 160. For example, as shown in FIG. 1, the management nodes 170 implement a load distribution management interface 172 which is utilized by an administrator to configure the load distribution management system 160. Moreover, in some embodiments, the load distribution management interface 172 it utilized to create, manage, and migrate the distribution targets 144 that run on the storage server nodes 140, as well as create and manage "distribution templates" which are utilized to map user volumes to distribution targets 144 through the distribution templates, the details of which will be explained in further detail below. In some embodiments, the management nodes 170 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes in the network computing system 100, wherein the network computing system 100 may be an enterprise computing system, a cloud-based computing system, or other types of computing systems or information processing systems comprising multiple computing nodes associated with respective users. The host systems 110 issue data access requests (e.g., user I/O write requests and read requests) to the distributed data storage system 130, which are received by the load distribution management system 160 and distributed to distribution targets 144 of the storage server nodes 140, which handle the I/O workloads for processing the data access requests and for storing/reading data to/from the target storage nodes 150. As explained in further detail below, the load distribution management system 160 is configured to serve as an access point to the distributed data storage system 130 and as a centralized control system that is configured to distribute data access requests from the host systems 110 to distribution targets 144 of the storage server nodes 140 in balanced matter using mapping information derived from distribution templates.

The communications network 120 is configured to enable communication between the host systems 110 and the distributed data storage system 130, and peer-to-peer communication between the storage server nodes 140 of the distributed data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), a wireless network such as Wi-Fi or WiMAX, a storage fabric (e.g., IP-based or Fibre Channel (FC) storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication over switched fabric topology using, e.g., Transfer Control Protocol/Internet Protocol (TCP/IP) or other communication protocols such as a Fibre Channel (FC) protocol, a Fibre Channel over Ethernet (FCoE) protocol, a Non-Volatile Memory Express over Fabrics (NVMe-oF) protocol, an Internet Small Computer System Interface (iSCSI) protocol, InfiniBand, Gigabit Ethernet, etc., to implement I/O channels and support storage network connectivity. Numerous alternative networking arrangements are possible in a given embodiment, as will be appreciated by those skilled in the art. For example, in some embodiments, the communications network 120 comprises a converged network comprising a switched fabric IP network comprising LAN switches and storage area network (SAN) switches.

The distributed data storage system 130 may comprise any type of data storage system, or a combination of data storage systems, including, but not limited to, a storage area network (SAN) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. The storage server nodes 140 and the storage nodes 150 can be physical nodes, virtual nodes, and a combination of physical and virtual nodes.

The storage devices 152 of the storage nodes 150 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 152 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in each storage node 150. In this regard, the term "storage device" as used herein should be broadly construed to encompass all types of persistent storage media including hybrid drives.

In some embodiments, the distributed data storage system 130 comprises a disaggregated data storage system in which data processing is separate from data storage. More specifically, the storage server nodes 140 are configured to handle the processing of workloads associated with data access requests (i.e., I/O read and write requests) and process workloads associated with the data management services 142, and the storage nodes 150 are configured to handle writing/reading data to/from the respective storage devices 152. As noted above, the storage server nodes 140 and the storage nodes 150 can be physical nodes, virtual nodes, and a combination of physical and virtual nodes. When configured as a disaggregated data storage system, each storage server node 140-1, . . . , 140-s can directly access data stored on any one of the storage nodes 150-1, . . . , 150-s. The disaggregated storage system architecture essentially separates the storage control compute layers (e.g., storage server nodes 140) from the data storage layers (e.g., storage nodes 150) which are managed within the same fabric.

The distributed data storage system 130 can be configured using known techniques to implement a disaggregated data storage system. For example, in some embodiments, the storage nodes 150-1, . . . 150-s can be external direct-attached storage (DAS) devices or network-attached storage (NAS) devices. In some embodiments, the storage nodes 150-1, . . . , 150-s are connected to each storage server node 140-1, . . . , 140-s using any suitable interface protocol such as Small Computer Systems Interface (SCSI), Fibre Channel (FC), etc. In other embodiments, the storage nodes 150-1, . . . , 150-s are network-connected to each of the storage server nodes 140-1, . . . , 140-s via a high-performance network fabric using any suitable network configuration and network interface protocol such as Ethernet, FC, iSCSI, InfiniBand, etc. For example, in some embodiments, the storage server nodes 140 and storage nodes 150 are interconnected in a full-mesh network, wherein back-end interconnectivity between the storage server nodes 140 and the storage nodes 150 is achieved using, e.g., a redundant high-speed storage fabric, wherein the storage server nodes 140 can utilize remote procedure calls (RPC) for control messages and remote direct memory access (RDMA) for moving data blocks.

In some embodiments, each storage server node 140 is implemented on, e.g., a physical server machine or storage appliance comprising hardware processors, system memory, and other hardware resources that execute software and firmware to implement the various storage control functions and data management functions as discussed herein. More specifically, in some embodiments, each storage server node 140 comprises a plurality of storage control processors which execute a lightweight operating system (e.g., a customized lightweight Linux kernel) and functional software (e.g., software-defined storage software) to implement various data management functions of the storage server node 140.

For example, in some embodiments, the data management services 142 of the storage server nodes 140 implement a storage virtualization management module which is configured to create and manage storage volumes by aggregating the capacity of storage devices 152 of a given storage node 150, or multiple storage nodes 150, into one or more virtual storage pools from which logical volumes are allocated, wherein the logical volumes (e.g., a block unit of storage management) are identified by, e.g., logical unit numbers (LUNs) that are exposed as block devices. to the applications or host systems 110 which consume the data. A given storage volume can be generated which spans across a two or more of the storage nodes 150. For example, a virtual block device can correspond to a volume of a storage pool. Each virtual block device comprises any number of actual physical storage devices, wherein each block device is preferably homogeneous in terms of the type of storage devices that make up the block device (e.g., a block device can include only HDD devices or SSD devices, etc.).

Moreover, in some embodiments, the data management services 142 implement methods for performing various data management and storage services such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The distribution targets 144 comprise logical entities which are utilized for distributing I/O load processing over the cluster of storage server nodes 140 of the distributed data storage system 130. More specifically, each distribution target 144 comprises a logical processing unit (e.g., an operating system process) which is configured to handle the processing of user workloads. In some embodiments, each distribution target 144 is assigned to handle I/O processing associated with a block of logical addresses of a given volume, or handle multiple blocks of logical addresses for two or more different user volumes. In this regard, the logical address space of a given volume is mapped to multiple distribution targets, where the processing of user data associated with logical addresses of a given user volume is distributed across multiple distribution targets that reside on multiple storage server nodes 140.

Each storage server node 140 can implement any suitable number of distribution targets, e.g., 2 or more, depending on the processing resources (e.g., CPUs) and memory resources (e.g., RAM, persistent memory, etc.) of the storage server nodes 140. If a given storage server node is overloaded, a small number of distribution targets 144 can be moved from the loaded storage server to one or more other storage server nodes that are less loaded. Additionally, in the event of the failure of a given storage server node, the distribution targets 144 of the failed storage server can be distributed to other storage servers in the cluster, thereby retaining a balanced cluster of storage server nodes even after a failure.

Figure 2:
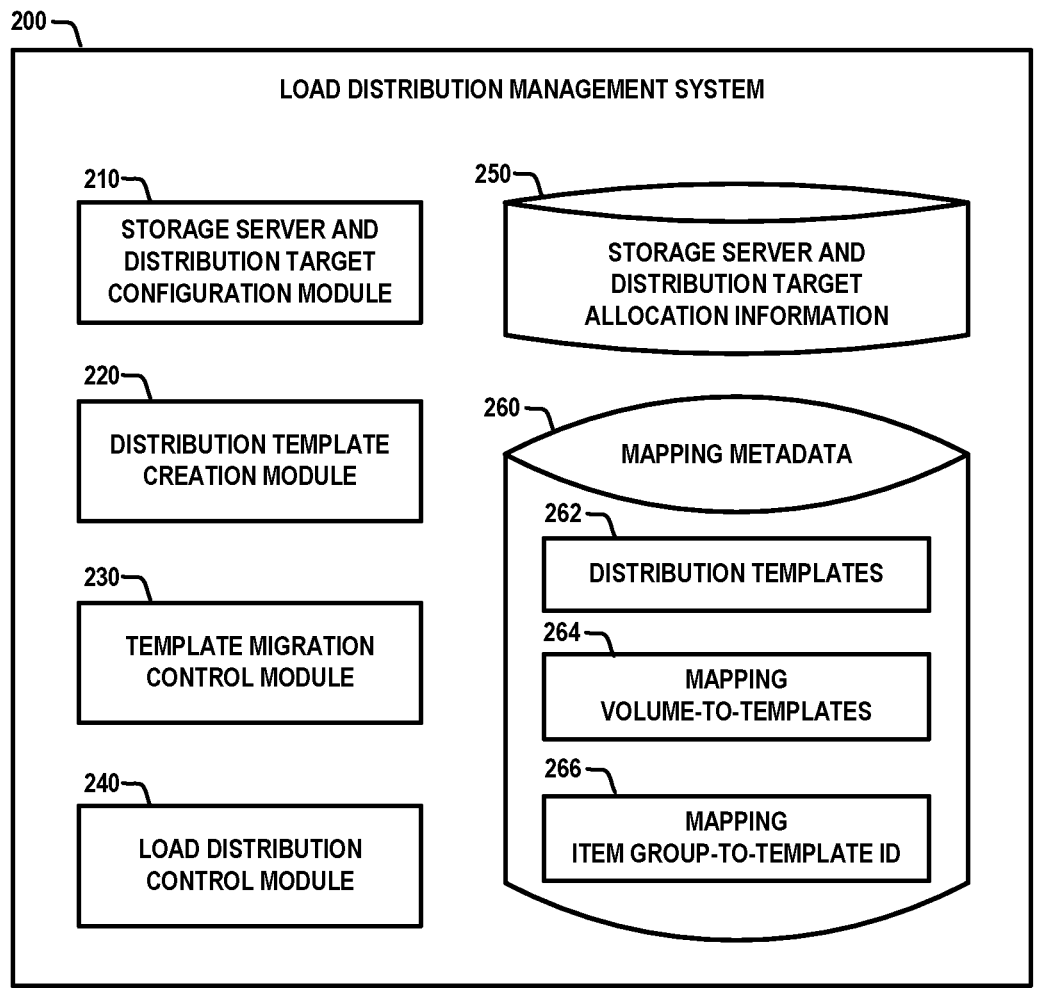
FIG. 2 schematically illustrates a load distribution management system which utilizes distribution templates, according to an exemplary embodiment of the disclosure.

FIG. 2 schematically illustrates a load distribution management system which utilizes distribution templates, according to an exemplary embodiment of the disclosure. More specifically, FIG. 2 schematically illustrates load distribution management system 200 which comprises a storage server and distribution target configuration module 210, a distribution template creation module 220, a distribution template migration control module 230, and a load distribution control module 240. Furthermore, the load distribution management system 200 generates and maintains various types of information which is utilized to perform load balancing functions such as a datastore of storage server and distribution target allocation information 250, and various types of persistent mapping metadata 260 including a set of distribution templates 262, a metadata structure 264 which comprises a mapping of a volume to distribution templates, and a metadata structure 266 which comprises a mapping of item groups to distribution template identifiers (IDs). In some embodiments, FIG. 2 schematically illustrates an exemplary architecture of the load distribution management system 160 of the distributed data storage system 130 of FIG. 1.

The storage server and distribution target configuration module 210 implements methods that are configured to provision storage server nodes that are added to the storage server cluster as part of a scale-out operation, as well as to configure and allocate new distribution targets on the newly added storage servers, when needed for large scale-outs, or otherwise reallocate and move existing distribution targets from existing storage server nodes to the newly added storage server nodes, for small scale-outs. The current state of the available storage server nodes and allocated distribution targets is maintained in the datastore 250.

The distribution template creation module 220 comprises methods that are configured to allow an administrator to create the set of distribution templates 262 through, e.g., the load distribution management interface 172 (FIG. 1). The set of distribution templates 262 comprises different distribution templates that are utilized to map "distribution items" to distribution targets. A "distribution item" comprises a fixed block size of data of a given granularity (e.g., 1 MB), which is utilized to distribute the workload processing of user data of a given volume to multiple distribution targets. More specifically, in some embodiments, the logical address space of a given user volume can be divided into a plurality of distribution items, wherein each distribution item comprises a block of logical addresses of the user volume which stores a block of data of a given size (e.g., 1 MB). For example, for a given user volume partitioned into distribution items with a fixed size of 1 MB, a first distribution item of the volume begins at offset of 0, a second distribution item of the volume begins at offset of 1 MB, a third distribution item of the volume begins at an offset of 2 MB, etc.

Furthermore, in some embodiments, each distribution template within the set of distribution templates 262 comprises a list of distribution targets associated with the distribution template. Each distribution template comprises a number of distribution targets on the order of tens, hundreds, or thousands of distribution targets, depending on the number of storage control nodes (or storage servers) within the storage system, and number of distribution targets that reside on the storage control nodes (based on the processing and memory resources of the storage control nodes). In some embodiments, the number of distribution templates within the set of distribution templates 262, which are utilized in a given storage system, can be on the order of tens or hundreds of different distribution templates, wherein each distribution template has a different sequential list of distribution targets.

In some embodiments, each distribution template comprises a unique template ID, which can be tracked using a small amount of metadata. For example, assuming the set of distribution templates 262 comprises 256 (or less) distinct distribution templates, a single byte of data (8-bits) is needed to track template IDs. As explained in further detail below, in some embodiments, the number of distribution templates within the set of distribution templates 262 does not change as the storage system is scaled-out (or scaled down), but rather, a new distribution template is created by changing the ordered list of distribution targets of an existing distribution templates to include new distribution targets, when additional storage control nodes with the new distribution targets are added to the storage system.

In some embodiments, a given user volume is mapped to a sequence of distribution templates which are selected from the set of distribution templates 262. For the given user volume, the metadata structure 264 is generated and maintained to track the sequence of distribution templates that are mapped to the given user volume. Furthermore, in some embodiments, a relatively large group of distribution items (denoted herein as "item group") is mapped to a single distribution template using a single template ID. The metadata structure 266 is generated and updated to track the mapping of item groups to corresponding template IDs. The metadata structures 264 and 266 require a relatively small amount of memory (e.g., few bytes) to maintain the mapping information.

The distribution template migration control module 230 implements methods that are configured to create new distribution templates based on existing distribution templates in instances when the storage system is scaled-out by adding more storage server nodes (e.g., storage control nodes) to the storage cluster with new distribution targets. In this instance, the distribution template migration control module 230 executes a template migration process which involves creating new distribution templates based on existing distribution templates to generate an updated set of distribution templates, wherein the total number of distribution templates remains constant. In some embodiments, a new distribution template is created from an existing distribution template by replacing some entries of existing distribution targets in the existing distribution template with the new distribution targets, and then moving data that is being migrated to the new distribution targets. The template migration process only moves data that is being migrated to a new distribution target, and does not require a full restructuring of all the data in the storage system. An exemplary template migration process will be explained in further detail below in conjunction with FIGS. 6 and 7.

The load distribution control module 240 implements methods that are configured to process a given data access request (e.g., I/O write or read request) by utilizing the mapping metadata 260 to (i) identify distribution items associated with the given data access request, (ii) determine distribution targets associated with the identified distribution items, and transmit I/O requests to the distribution targets to parallel process the given data access request in a distributed manner. An exemplary process flow that is implemented by the load distribution control module 240 will be discussed in further detail below in conjunction with FIG. 4.

Figure 3A:
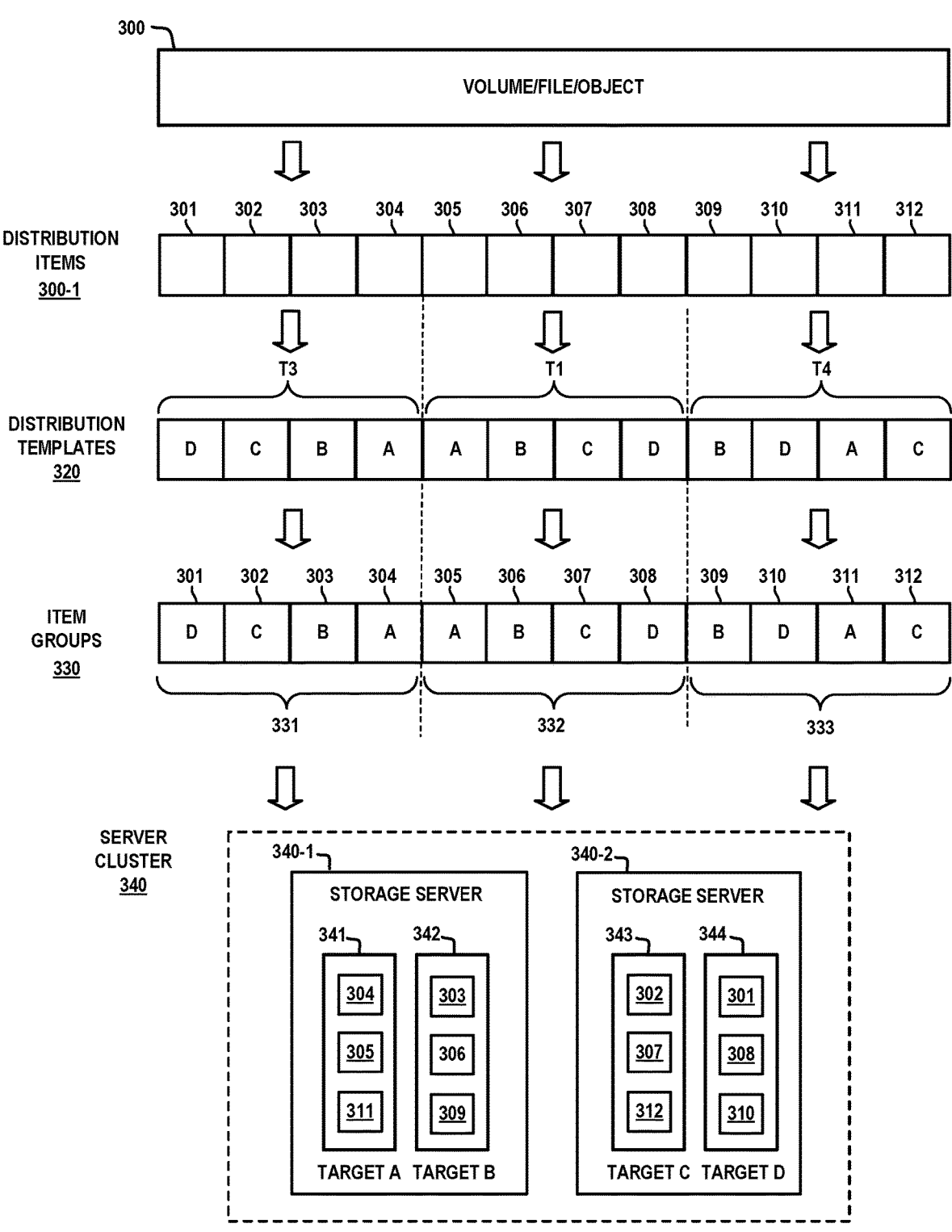
FIGS. 3A and 3B schematically illustrate a method for managing load distribution using distribution templates, according to an exemplary embodiment of the disclosure.
Figure 3B:
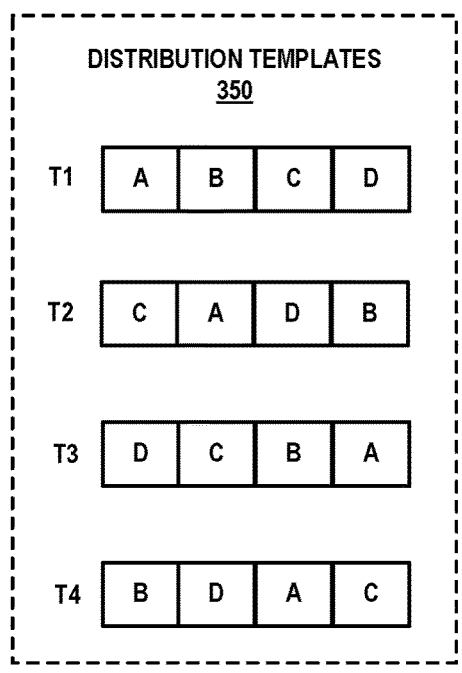

FIGS. 3A and 3B schematically illustrate a method for managing load distribution using distribution templates, according to an exemplary embodiment of the disclosure. In particular, FIG. 3A schematically illustrates a method for mapping a block of logical addresses of a given volume, file, object, etc., to a plurality of distribution targets that reside in storage servers (e.g., storage control nodes) using a set of distribution templates as shown in FIG. 3B. As shown in the illustrative embodiment of FIG. 3A, a block of logical addresses 300 of a given volume, file, or object is partitioned into a plurality of distribution items 300-1 comprising distribution items 301, 302, 303, 304, 305, 306, 307, 308, 309, 310, 311, and 312. As noted above, a "distribution item" corresponds to a fixed data block size of a given granularity (e.g., 1 MB), which is utilized to distribute the workload processing of user data to multiple distribution targets. In FIG. 3A, each distribution item 301, 302, 303, 304, 305, 306, 307, 308, 309, 310, 311, and 312 comprises a portion of the block of logical addresses 300 of the given volume, file, or object, which corresponds to a data block of fixed size (e.g., 1 MB). In this regard, assuming that the granularity used for load distribution is 1 MB, the block of logical addresses 300 in FIG. 3A represents, e.g., a 12 MB portion of a given volume, a 12 MB file, or a 12 MB object.

FIG. 3A further illustrates distribution templates 320, item groups 330, and a storage server cluster 340 comprising a first storage server 340-1, and a second storage server 340-2. The first storage server 340-1 comprises a first distribution target 341 (or target A), and a second distribution target 342 (or target B). The second storage server 340-2 comprises a third distribution target 343 (or target C), and a fourth distribution target 344 (or target D). For ease of illustration and explanation, FIG. 3A illustrates the storage server cluster 340 comprising two storage servers 340-1 and 340-2, each with two distribution targets, although it is to be understood that each storage server 340-1 and 340-2 may comprise more than two distribution targets, and that the storage server cluster 340 can have more than two storage servers.

Further, FIG. 3B illustrates an exemplary set of distribution templates 350 comprising a first distribution template T1, a second distribution template T2, a third distribution template T3, and a fourth distribution template T4. In the illustrative embodiment, each distribution template T1, T2, T3, and T4 comprises fourth template entries which comprise an ordered list of distribution targets, which is uniquely different for each distribution template. For example, the first distribution template T1 comprises a list of distribution targets in the order of A-B-C-D. The second distribution template T2 comprises a list of distribution targets in the order of C-A-D-B. The third distribution template T3 comprises a list of distribution targets in the order of D-C-B-A. The fourth distribution template T4 comprises a list of distribution targets in the order of B-D-A-C.

In some embodiments, as shown in FIG. 3B, each distribution template T1, T2, T3, and T4 comprises least one entry for each of the available distribution targets 341, 342, 343, and 344 of the storage servers 340-1 and 340-2 in the storage server cluster 340, but with uniquely different orders. While the set of distribution templates 350 is shown in FIG. 3B to include four different distribution templates T1, T2, T3, and T4 for ease of illustration and explanation, as noted above, the set of distribution templates 350 can have hundreds of unique distribution templates. The distribution templates can be reused multiple times in a mixed manner to provide diversity to the distribution order of, e.g., the logical address space of a given volume.

Moreover, while each distribution template T1, T2, T3, and T4 is shown to include one entry for each distribution target A, B, C, and D, as noted above, each distribution template T1, T2, T3, and T4 can have hundreds or thousands of entries, where each distribution target A, B, C, and D is included in multiple entries of a given distribution template. For example, in some embodiments, a given distribution template can include a unique order of distribution targets which is repeated multiple times. By way of example, the first distribution template T1 can have sixteen (16) distribution target entries which include the unique ordering of the four distribution targets A, B, C, D repeated 4 times, resulting in a distribution template having the following unique ordering of distribution targets: A-B-C-D-A-B-C-D-A-B-C-D-A-B-C-D. The same applies for the other distribution templates T2, T3, and T4.

Referring back to FIG. 3A, the distribution items 301, 302, 303, 304, 305, 306, 307, 308, 309, 310, 311, and 312 are mapped to the distribution targets 341 (A), 342 (B), 343 (C), and 344 (D) using the sequence of distribution templates T3, T1, and T4, which are selected (e.g., randomly selected) from the set of distribution templates 350 of FIG. 3B. The mapping of the distribution items 300-1 to the distribution targets A, B, C, and D through the selected sequence of distribution templates 320 results in the plurality of item groups 330, which includes a first item group 331, a second item group 332, and a third item group 333. FIG. 3A illustrates that a group of distribution items (item group) is mapped to a single distribution template (having a unique template ID). More specifically, as shown in the illustrative embodiment of FIG. 3A, the distribution template T3 is utilized to map the distribution items 301, 302, 303, and 304 to the distribution targets D, C, B, and A, respectively, resulting in the first item group 331. In addition, the distribution template T1 is utilized to map the distribution items 305, 306, 307, and 308 to the distribution targets A, B, C, and D, respectively, resulting in the second item group 332. Further, the distribution template T4 is utilized to map the distribution items 309, 310, 311, and 312 to the distribution targets B, D, A, and C, resulting in the third item group 333.

As further shown in FIG. 3A, the distribution items 301, 302, 303, 304, 305, 306, 307, 308, 309, 310, 311, and 312 are distributed to the distribution targets 341, 342, 343, and 344 of the storage servers 340-1 and 340-2, based on the distribution mapping. In particular, the distribution items 304, 305, and 311 are distributed to the first distribution target 341 for processing, the distribution items 303, 306, and 309 are distributed to the second distribution target 342 for processing, the distribution items 302, 307, and 311 are distributed to the third distribution target 343 for processing, and the distribution items 301, 308, and 310 are distributed to the fourth distribution target 344 for processing.

Figure 4:
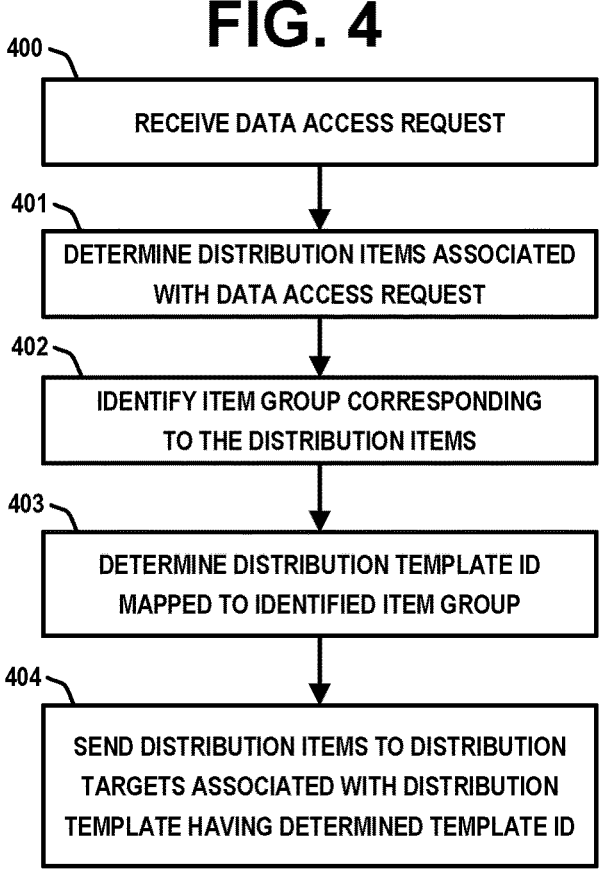
FIG. 4 illustrates a flow diagram of a method for load distribution based on distribution templates, according to an exemplary embodiment of the disclosure.

FIG. 4 illustrates a flow diagram of a method for load distribution based on distribution templates, according to an exemplary embodiment of the disclosure. More specifically, in some embodiments, FIG. 4 illustrates an exemplary mode of operation of the load distribution control module 240 (FIG. 2) to distribute I/O workload across the distribution targets of storage server nodes in a balanced manner. The load distribution control module receives a data access request (block 400). For example, the data access request may comprise an I/O write request with data to be written to a data storage system. The load distribution control module determines one or more distribution items that are associated with the data access request (block 401). For example, in some embodiments, the distribution items are determined based on one or more logical addresses specified in the data access request.

The load distribution control module then proceeds to identify at least one item group associated with the determined distribution items (block 402). As noted above, each item group comprises a plurality of distribution items that are mapped to a given distribution template. The load distribution control modules proceed to determine a template ID of the distribution template that is mapped to the identified item group (bock 403). The load distribution control module then accesses the distribution template having the determined ID to determine the distribution targets associated with the distribution items of the given data access request, and sends the distribution items to the respective distribution targets that are responsible for handling the I/O processing of the distribution items of the given data access request targets (block 404).

Figure 5:
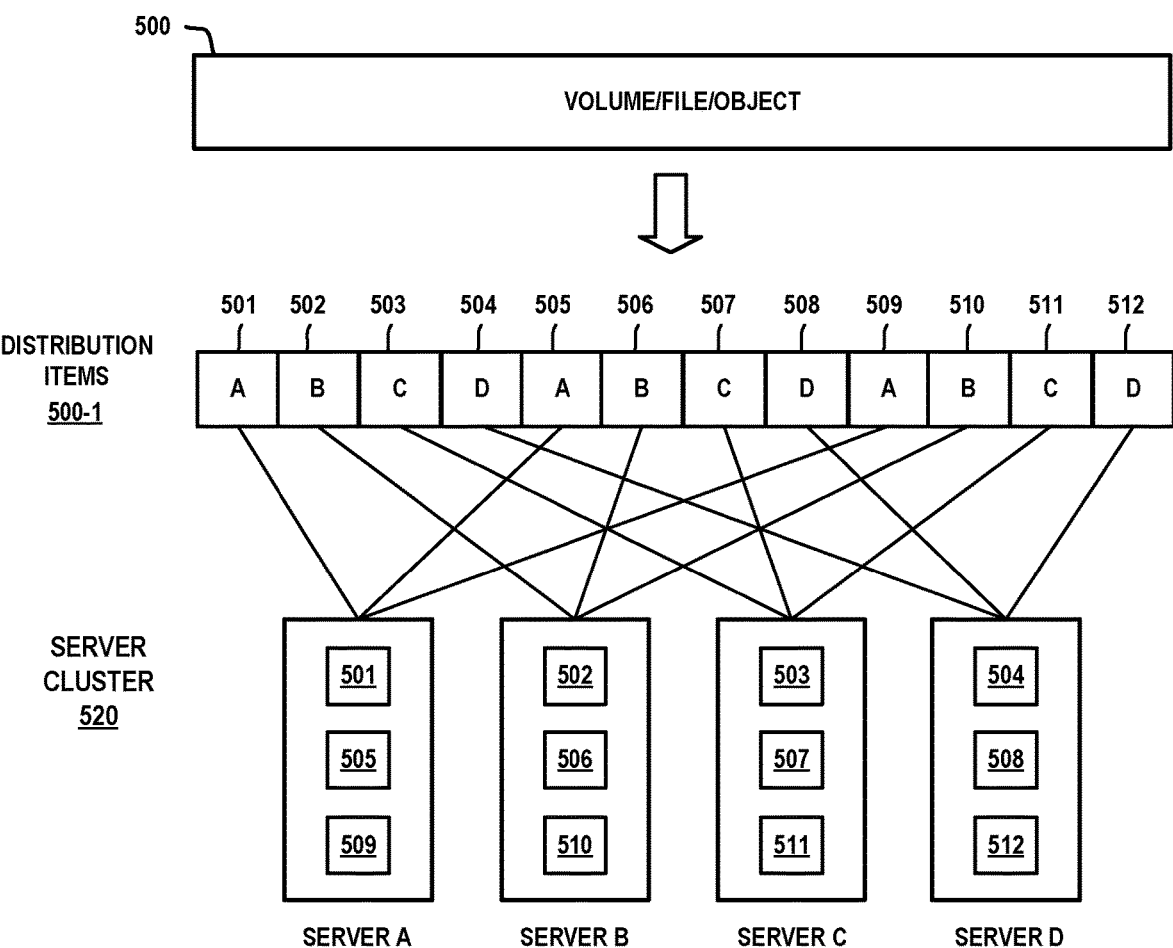
FIG. 5 schematically illustrates a conventional method for distributing load processing among a plurality of storage server nodes without using distribution templates.

It is to be appreciated that the exemplary load distribution process shown in FIGS. 3A and 3B provides significant advantages over conventional load distribution techniques which utilize, e.g., a round robin process to spread user data across a plurality of storage servers. For example, FIG. 5 schematically illustrates a conventional method for distributing load processing among a plurality of storage server nodes. Similar to FIG. 3A, FIG. 5 illustrates a block of logical addresses 500 of a given volume, file, or object that is partitioned into a plurality of distribution items 500-1 comprising distribution items 501, 502, 503, 504, 505, 506, 507, 508, 509, 510, 511, and 512. FIG. 5 schematically illustrates a method of mapping the distribution items to a server cluster 520 comprising four storage servers A, B, C, and D using a round robin mapping based on a repeated sequence A-B-C-D. In particular, as shown in FIG. 5, the round robin mapping with the repeated storage server sequence A-B-C-D results in (i) the distribution items 501, 505, and 509 being distributed to the storage server A for processing, (ii) the distribution items 502, 506, and 510 being distributed to the storage server B for processing, (iii) the distribution items 503, 507, and 511 being distributed to the storage server C for processing, and (iv) the distribution items 504, 508, and 512 being distributed to the storage server D for processing.

The load distribution method shown in FIG. 5 involves mapping blocks of a logical address space of a given volume, e.g., as represented by the distribution items 501,

502, 503, 504, 505, 506, 507, 508, 509, 510, 511, and 512, to a plurality of storage servers. Such a load balancing process is problematic in the event that additional storage servers are added (or removed) from the server cluster 520, due to the overhead associated with having to (i) update the metadata which tracks the per distribution item mapping to the storage servers, and (ii) perform data migration operations to migrate the data between the storage servers based on the updated mapping of distribution items to the storage servers. Another disadvantage associated with the load distribution method shown in FIG. 5 is that a repetitive workload will reach the same server. For example, assume the address space is composed of virtual machines with the size of 4 distribution items (A, B, C, D). In a circumstance wherein the beginning of each virtual machine is continuously accessed, then all I/O will be directed to server A.

In contrast to conventional methods (e.g., FIG. 5) which map portions of a user logical space to storage servers, the exemplary load balancing techniques discussed herein are configured to spread the distribution items across distribution targets that reside on the storage servers, wherein each storage server contains two or more distribution targets. If a given storage server is overloaded, a small number of distribution targets can be moved from the loaded storage server to other storage servers that are less loaded. Additionally, in the event of a storage server failure, the distribution targets of the failed storage server can be spread to other storage servers, thereby retaining a balanced cluster even after a failure.

In a conventional process such as shown in FIG. 5, the distribution items associated with, e.g., a logical volume, would be mapped directly to distribution targets using a round robin process, which can be problematic for various reasons. For example, a repeated distribution sequence of the round robin process (e.g., A-B-C-D-A-B-C-D-A-B-C-D . . . , as shown in FIG. 5) can result in two sequential flows in different regions of the logical address, which keep utilizing the same distribution targets, thereby creating high load in specific storage servers. Furthermore, the mapping of distribution items to distribution targets would require a relatively large amount of metadata to map a single distribution item to a single distribution target. Furthermore, when the storage system is scaled out with additional storage servers, and new distribution targets are added, the metadata mapping of distribution items to the distribution target will need to be updated. Such updates require significant overhead since changing the distribution is difficult in circumstances where each distribution target handles the I/O processing of many distribution items. Furthermore, persistent data structures need to be created and maintained to find the distribution items that are accessed by each distribution target.

Moreover, the load processing distribution works well when a predefined number of distribution targets exist, but can be problematic as the number of storage servers in the cluster significantly increases and decreases over time. For example, a storage system can be initially configured with a predetermined number of distribution targets based on a maximum number of storage servers in the storage cluster. For example, a storage cluster may initially have 10 storage servers, with each storage server having 10 distribution targets (e.g., a total of 100 distribution targets spread across 10 storage servers). This solution is sufficient when the number of storage servers is increased by a single order of magnitude, but not particularly suitable for ultra-scale-out systems.

For example, assume 10 additional storage servers are added in the storage cluster, resulting in 20 storage servers. In this circumstance, some of the existing distribution targets can be moved to the new storage servers, such that the initial 100 distribution targets are spread across 20 storage servers (e.g., 5 distribution targets per storage server), resulting in a sufficient utilization of the capacity of each storage server for distributed processing. On the other hand, if 90 additional storage servers are added to the cluster (resulting in a total of 100 servers), moving some of the existing distribution targets to the new storage servers would result in the initial 100 distribution targets being spread across 100 storage servers (e.g., 1 distribution target per storage server), resulting in an insufficient utilization of the capacity of the storage servers for distributed processing. In other words, instances in which the number of distribution targets is relatively small as compared to the number of available storage servers, results in underutilization of the processing and storage capacity of the storage servers.

In such instances, the number of distribution targets would be increased to be commensurate with the increased number of storage servers. For example, an additional 100 distribution targets can be provisioned and configured on the storage servers, resulting in a total of 200 distribution targets spread across 100 storage servers in a manner which is deemed a sufficient utilization of the resources of the storage servers. However, if the storage cluster is subsequently scaled down for a given reason, e.g., down to the original 10 storage servers, the increased number of distribution targets (e.g., 200 distribution targets) would need to be distributed over a smaller number of storage servers (e.g., 200 distribution targets distributed over 10 storage servers). In this instance, the initial storage system (e.g., 10 storage servers) may not have the ability to handle the increased number of distribution targets. For example, the amount of RAM or PMEM (persistent memory) that is available on a given storage server per distribution target may not be sufficient to handle all the distribution target at once, resulting in excessive swapping between distribution targets in the storage server processor (e.g., CPUs). Moreover, the metadata overhead associated with the large amount of distribution targets (which are directly mapped to distribution items) may be too large to be efficiently managed by the system.

The exemplary techniques for managing load distribution as discussed herein overcome the above-noted problems associated with load distribution techniques that directly map distribution items to storage servers or distribution targets using, e.g., a round robin process. In particular, as discussed above in conjunction with, e.g., FIGS. 3A and 3B, the mapping of distribution items to distribution targets is implemented using distribution templates which provide an intermediate layer of association between the distribution items and distribution targets. A given logical address space is mapped to a sequence of templates (as opposed to a sequence of distribution targets), and a large group of distribution items (item group) are mapped to a single template using a single template ID.

In other words, instead of mapping distribution items directly to distribution targets, which would require a significant amount of metadata, an item group which contains a large amount of distribution items (e.g., on the order of thousands of distribution items) is defined and mapped to a distribution template from a set of distribution templates. The content of a given distribution template defines how to map the distribution items in a given item group to distribution targets. In this regard, a large amount of distribution items (item group) of a given volume will have the same template ID. The set of distribution templates includes a large amount (e.g., hundreds) of unique templates, wherein each distribution template can be reused many times in a mixed manner to provide diversity to the distribution order. The distribution templates provide means for distributing I/O workload at the granularity of distribution items, but advantageously by reusing distribution templates in a manner that requires much less memory to maintain the metadata mapping information. For example, as noted above, a set of distribution templates having 256 unique distribution templates only requires one byte of memory (8 bits) to the template ID metadata. The reuse of the distribution templates does not have a significant negative affect on distribution diversity because the distribution targets within a given distribution template are diversified and the use of the distribution templates themselves provides diversification.

Furthermore, in some embodiments, the number of distribution templates within a given set of distribution templates remains constant even when the cluster of storage servers is scaled out with additional storage servers and new distribution targets and added. In addition, in some embodiments, the size of each distribution template (e.g., number of entries for the ordered list of distribution targets) is relatively much larger than the number of distribution targets that reside across the storage servers. In this regard, the size of each distribution template will remain the same, even when new distribution targets are created for additional storage servers that are added to the cluster of storage servers. However, when new distribution targets are added to the storage servers, the existing set of distribution templates will be updated using a template migration process which involves modifying/updating the sequential list of distribution targets for each distribution template to add entries for the new distribution targets, while keeping the number of entries of the distribution template constant. The addition of new distribution targets and the resulting updates to the distribution templates is performed in instances where the number of additional storage servers added to the storage cluster is relatively large (e.g., large scale-out), while the distribution templates are not modified when a relatively small amount of additional servers are added to the storage cluster (e.g., small scale-out), and existing distribution targets are moved from some existing storage servers to the newly added storage servers without creating new distribution targets for the newly added servers.

For example, in some embodiments, a "small scale out" is defined as a scale-out that adds up to, e.g., 2 times (2×) the number of the original storage server nodes in the server cluster, and a "large scale-out" is defined as a scale-out that adds more than 2× the number of the original storage server nodes in the server cluster. For a small scale-out, the existing distribution targets are redistributed across the storage servers without any need to add new distribution targets. As such, for a small scale-out, the distribution templates remain the same and are not updated. On the other hand, for a large scale-out, new distribution targets are provisioned and added to storage servers within the scaled-out server cluster to avoid underutilization of the resources (e.g., processing, memory, and storage resources) of the storage servers in the scaled-out cluster. For example, if the number of storage servers increases by more than 2×, then the number distribution targets may increase by the same amount. This is accomplished by creating new distribution targets and creating new distribution templates in place of existing distribution templates by replacing some distribution target entries in the existing distribution templates with new distribution targets using a template migration process. The creation of new distribution templates only requires moving data that is being migrated to the new distribution targets, and not a full restructuring of all the data in the storage system.

Figure 6:
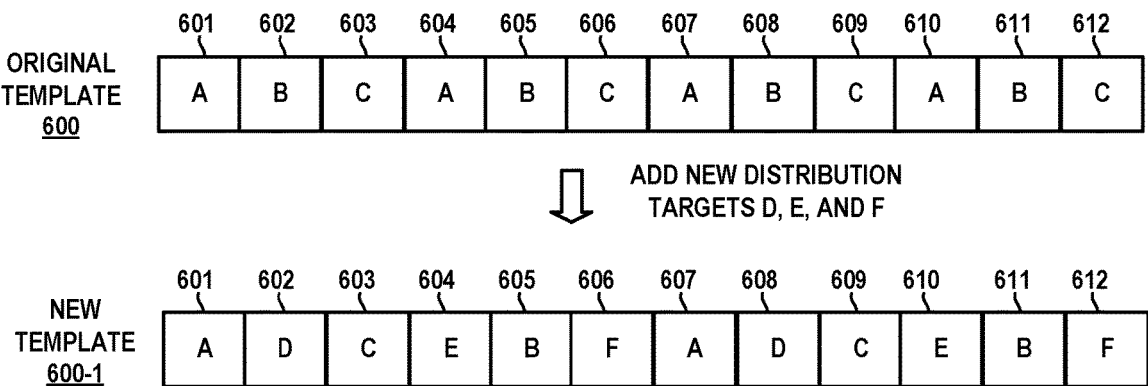
FIG. 6 schematically illustrates a method for creating a new distribution template as part of a template migration process, according to an exemplary embodiment of the disclosure.

FIG. 6 schematically illustrates a method for creating a new distribution template as part of a template migration process, according to an exemplary embodiment of the disclosure. More specifically, FIG. 6 illustrates an exemplary original distribution template 600, and a new distribution template 600-1 which is generated by adding new distribution targets in place of existing distribution targets in original distribution template 600. For ease of illustration, the original distribution template is shown to include 12 entries 601, 602, 603, 604, 605, 606, 607, 608, 609, 610, 611, and 612, which include one of three distribution targets A, B and C, with a sequence of A-B-C-A-B-C-A-B-C-A-B-C in the respective entries 601, 602, 603, 604, 605, 606, 607, 608, 609, 610, 611, and 612. In this illustrative embodiment, the original distribution template 600 is shown to include a number of entries (e.g., 12 entries) which is greater than the total number of distribution targets (e.g., three distribution targets A, B, and C) allocated across the storage servers.

The distribution template update process of FIG. 6 assumes that new distribution targets D, E, and F have been provisioned and configured on newly added storage servers as part of scale-out of the storage system. In the illustrative embodiment, the new distribution template 600-1 is generated by updating the entries 602, 604, 606, 608, 610, and 612 of the original distribution template 600 to include the new distribution target entries of D, E, F, D, E, and F, respectively, which results in the new distribution template 600-1 having a distribution target sequence of A-D-C-E-B-F-A-D-C-E-B-F. In the illustrative embodiment of FIG. 6, the new distribution template 600-1 is shown to include the same number of entries (e.g., 12 entries) as the original distribution template 600, while including an increased total number of distribution targets (e.g., 6 distribution targets A, B, C, D, E, and F) which are allocated across the storage servers. With this process, the new distribution template 600-1 is created based on the original distribution template 600 wherein the new distribution template 600-1 comprises a unique template ID, and the original distribution template 600 is deleted. The distribution items are updated to point to the new distribution template 600-1.

As noted above, since distribution templates are each designed to have a number of entries which is greater than the total number of current (or anticipated) distribution targets at any given time, the distribution template creation process does not involve increasing the size of the distribution templates, which would otherwise require significant overhead in remapping the user space to the larger size distribution templates and migrating data across the storage servers. For example, in an illustrative embodiment, each distribution template can have 2K entries, which are designed to spread distribution items over 50 distribution targets. In this instance, each distribution template would include a unique sequential ordering of the 50 distribution targets, wherein in some embodiments, each of the 50 distribution targets would be included 40 times in each of the distribution templates, i.e., each distribution template comprises 40 entries for each of the 50 distribution targets. The same set of distribution templates would be able to accommodate a large scale out in which the total number of distribution targets is increased from 50 to, e.g., 1000 distribution targets, in which case new distribution templates can be created from the existing distribution templates to include new unique sequential orderings of the 1000 distribution targets with each distribution template comprising two (2) entries per distribution target.

Figure 7:
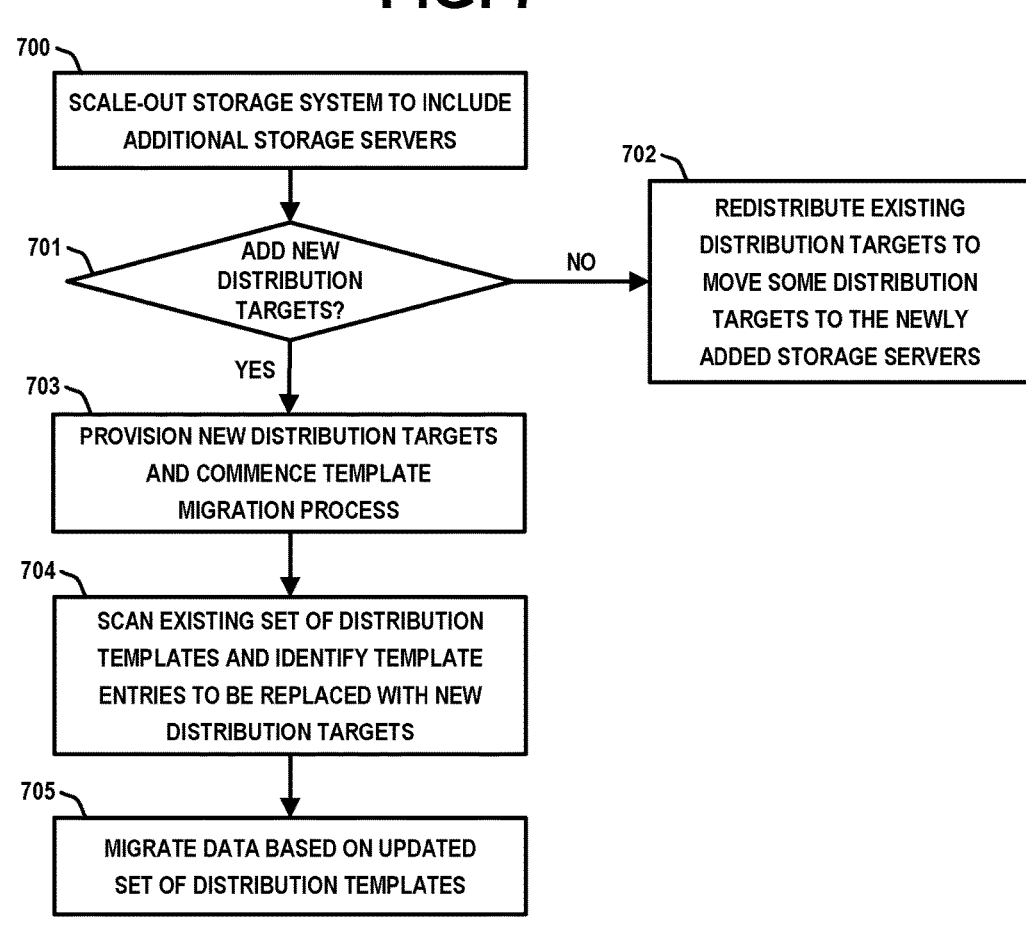
FIG. 7 is flow diagram of a method for managing distribution targets when adding storage servers to a data storage system, according to an exemplary embodiment of the disclosure.

FIG. 7 is flow diagram of a method for managing distribution targets when adding storage servers to a data storage system, according to an exemplary embodiment of the disclosure. Initially, a storage system is scaled-out to include additional storage servers (block 700). A determination is then made as to whether new distribution targets should be added to the storage system in view of the newly added servers (block 701). If it is determined that new distribution targets do not need to be added to the storage system (negative determination in block 701), the existing distribution targets are redistributed to move some existing distribution targets to the newly added storage servers (block 702). For example, as noted above, in the event of a small scale-out (e.g., the total amount of storage servers is less than 2× the number of original storage servers with the original allocation of distribution targets), it may be that some of the existing distribution targets on the original storage servers can be moved to the newly added storage servers, which still have a sufficient utilization of the resources of the storage server within the scaled-out cluster.

On the other hand, if it is determined that new distribution targets need to be added to the storage system (affirmative determination in block 701), new distribution targets are provisioned and configured on the newly added storage servers and a template migration process is commenced (block 703). For example, as noted above, in the event of a large scale-out (e.g., total amount of storage servers is greater than 2× the number of the original storage servers with the original allocation of distribution targets), additional distribution targets should be added to the newly added storage servers, to ensure a sufficient utilization of the resources of the storage servers within the scaled-out cluster.

The template migration process proceeds by scanning the existing set of distribution templates to identify template entries to be replaced with the new distribution targets (block 704). For example, as noted above, FIG. 6 illustrates an exemplary process for creating a new distribution template based on an original distribution template, wherein the distribution items are updated to point to the new distribution template, and the original distribution template is deleted. Next, the migration process is performed to migrate data based on the updated set of distribution templates (block 705). In some embodiments, the migration process involves moving the distribution items associated with distribution targets that were replaced in the original template to the new distribution targets. For example, in the illustrative embodiment of FIG. 6, the distribution items mapped to the original distribution targets in the template entries 602, 604, 606, 608, 610, and 612 of the original distribution template 600 are moved to one of the new distribution targets D, E, or F based on the which of the new distribution targets added to the template entries 602, 604, 606, 608, 610, and 612 of the new distribution template 600-1.

With this process, only those distribution items within an item group which are mapped to updated template entries are moved to the new distribution targets included in the updated template entries, while the distribution items within the item group which are still mapped to the original template entries are not moved. Once the template migration process is complete, the volume-to-template mapping information is updated to include new template IDs for the new distribution templates, and release the template IDs for the original templates.

Advantageously, the template migration process requires no additional metadata, and can be performed simply by scanning the existing distribution template to identify template entries to be updated/replaced with new distribution targets. This is also true for the case in which the distribution item needs to be updated. Since the metadata is significantly compact, there is not significant overhead in scanning all the entries. While the scanning process may take some time, the template migration process is performed when adding additional storage servers to the system. In such instance, the scale-out process is not time sensitive so even a few minutes to perform the scanning process is considered a negligible amount of time. In another embodiment, reverse lookup metadata structures can be used if RAM is highly available. The exemplary load distribution techniques discussed herein support both options.

It is to be appreciated that the exemplary load distribution techniques using distribution templates as discussed herein, provide a lightweight load distribution solution that is suitable for scale out, disaggregated architectures. In addition, the exemplary load distribution techniques utilize distribution templates to provide low overhead in managing the metadata needed to map a logical address space to distribution targets. In addition, there is no increase in the size of the distribution templates when scaling out a storage server cluster. Further, the more expensive process of template migration only occurs when there is no performance urgency (i.e., during the scale-out process), and does not require all data in the system to be migrated to reach a new distribution state after the template migration (e.g., only the distribution items moving to new distribution targets have their data moved). In addition, the exemplary load distribution techniques discussed herein also support system contraction (i.e., when the number of storage servers is decreased). Moreover, the exemplary load distribution techniques discussed herein allow for scale-out using a versatile strategy of spreading out existing distribution targets for small scale-outs, while adding new distribution targets and performing template migration for large scale-outs. Further, the exemplary load distribution techniques discussed herein provide support for disaggregated storage architectures by avoiding any reliance on capacity-based parameters for load distribution.

Figure 8:
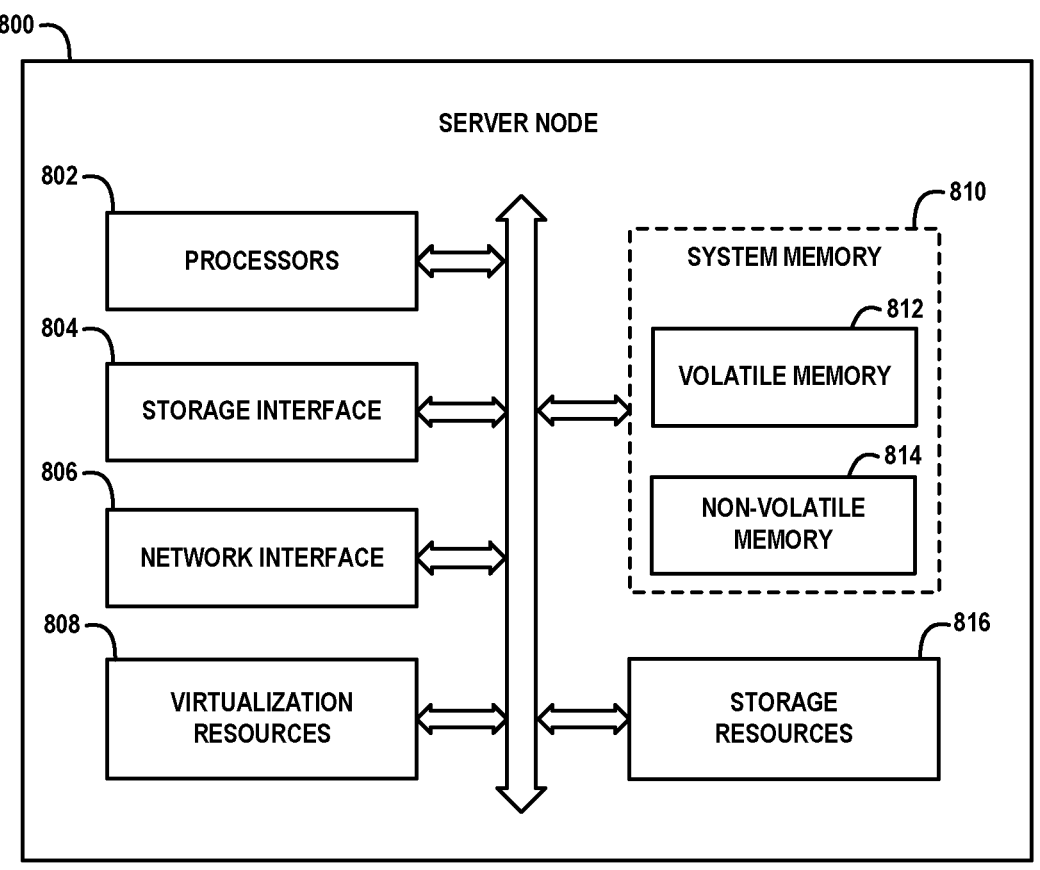
FIG. 8 schematically illustrates a framework of a server node for hosting a load distribution management system, according to an exemplary embodiment of the disclosure.

FIG. 8 schematically illustrates a framework of a server node for hosting a load distribution management system, according to an exemplary embodiment of the disclosure. For example, FIG. 8 schematically illustrates a server node 800 which can be configured to host the load distribution management systems as shown in FIGS. 1 and 2. In addition, FIG. 8 illustrates a server node which can be configured to implement the storage servers shown in FIG. 1. The server node 800 comprises processors 802, storage interface circuitry 804, network interface circuitry 806, virtualization resources 808, system memory 810, and storage resources 816. The system memory 810 comprises volatile memory 812 and non-volatile memory 814. The processors 802 comprise one or more types of hardware processors that are configured to process program instructions and data to execute a native operating system (OS) and applications that run on the server node 800.

For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more services or functions which are hosted by the server node 800. For example, the virtualization resources 808 can be configured to implement the various modules and functionalities of a host connectivity management system as discussed herein. In some embodiments, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well execute one or more of the various modules and functionalities of a storage control node and a data deduplication control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the load distribution management system 200 of FIG. 2 are implemented using program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile memory 812 is configured as the highest-level memory tier, and the non-volatile memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:

managing, by a load distribution management system, a distribution of an input/output (I/O) workload comprising I/O operations among storage server nodes of a data storage system comprising the storage server nodes and storage nodes, wherein each storage server node comprises one or more distribution targets that run on the storage server node, wherein each distribution target comprises a logical processing unit that is configured to manage I/O operations of a given storage server node for accessing data in one or more of the storage nodes;

wherein managing the distribution of the I/O workload among the storage server nodes comprises:

generating, by the load distribution management system, mapping metadata which maps a logical address space of a given storage volume to a set of distribution targets that run on the storage server nodes, wherein generating the mapping metadata comprises:

partitioning the logical address space of the given storage volume into a plurality of distribution items, each distribution item being associated with a corresponding block of logical addresses of the logical address space of the given storage volume;

mapping the logical address space of the given storage volume to a sequence of distribution templates, wherein each distribution template in the sequence of distribution templates comprises a respective unique ordered list of entries that identify distribution targets of the set of distribution targets that run on the storage server nodes, wherein the respective unique ordered list of entries for each distribution template comprises at least one entry for each distribution target of the set of distribution targets that run on the storage server nodes, and such that the respective unique ordered list of entries for each distribution template in the sequence of distribution templates is uniquely different from the respective unique ordered list of entries of other distribution templates in the sequence of distribution templates; and utilizing the sequence of distribution templates to map the distribution items associated with the logical address space of the given storage volume to the distribution targets that run on the storage server nodes such that each distribution target handles I/O operations associated with a group of distribution items that are mapped to that distribution target; and in response to receiving a given data access request for the given storage volume, utilizing the mapping metadata to identify one or more distribution items associated with the given data access request, and to distribute the one or more identified distribution items to respective distribution targets to which the one or more distribution items are mapped, for performing I/O operations associated with the one or more distribution items.

2. The method of claim 1, wherein mapping the logical address space of the given storage volume to the sequence of distribution templates, comprises:

grouping the distribution items that are mapped to distribution targets by a given distribution template into an item group; and mapping the item group to the given distribution template by a unique template identifier of the given distribution template.

3. The method of claim 1, wherein the distribution templates in the sequence of distribution templates are selected from a set of distribution templates having a fixed number of uniquely different distribution templates having the respective unique ordered list of entries that identify distribution targets of the set of distribution targets.

4. The method of claim 3, wherein the respective unique ordered list of entries of each distribution template in the set of distribution templates comprises a fixed number of entries of distribution targets, wherein the fixed number of entries of distribution targets is greater than a total number of distribution targets on the storage server nodes.

5. The method of claim 4, wherein managing the distribution of the I/O workload among the storage server nodes further comprises:

scaling the data storage system to include additional storage server nodes;

provisioning additional distribution targets on the additional storage server nodes; and creating new distribution templates in place of existing distribution templates of the set of distribution templates to include the additional distribution targets without permanently increasing the fixed number of entries of distribution targets of the distribution templates.

6. The method of claim 5, wherein creating new distribution templates in place of existing distribution templates of the set of distribution templates to include the additional distribution targets comprises:

scanning the existing distribution templates of the set of distribution templates to select template entries to be replaced with the additional distribution targets; and incorporating the additional distribution targets into the selected template entries of the existing distribution templates of the set of distribution templates to generate new distribution templates from the existing distribution templates.

7. The method of claim 6, further comprising performing a data migration process to migrate data by moving distribution items associated with the data to corresponding distribution targets, based on the new distribution templates.

8. The method of claim 3, wherein the unique ordered list of entries of a given distribution template comprises multiple sequentially repeated instances of a same unique sequential order of the distribution targets.

9. The method of claim 3, wherein managing the distribution of the I/O workload among the storage server nodes further comprises:

scaling the data storage system to include additional storage server nodes; and moving at least a portion of the distribution targets on the storage server nodes to the additional storage server nodes, without adding additional distribution targets to the additional storage server nodes, and without updating the distribution templates of the set of distribution templates.

10. An article of manufacture comprising a non-transitory processor-readable storage medium having stored therein program code of one or more software programs, wherein the program code is executable by one or more processors to implement a method which comprises:

managing, by a load distribution management system, a distribution of input/output (I/O) workload comprising I/O operations among storage server nodes of a data storage system comprising the storage server nodes and storage nodes, wherein each storage server node comprises one or more distribution targets that run on the storage server node, wherein each distribution target comprises a logical processing unit that is configured to manage I/O operations of a given storage server node for accessing data in one or more of the storage nodes;

wherein managing the distribution of the I/O workload among the storage server nodes comprises:

generating, by the load distribution management system, mapping metadata which maps a logical address space of a given storage volume to a set of distribution targets that run on the storage server nodes, wherein generating the mapping metadata comprises:

partitioning the logical address space of the given storage volume into a plurality of distribution items, each distribution item being associated with a corresponding block of logical addresses of the logical address space of the given storage volume;

mapping the logical address space of the given storage volume to a sequence of distribution templates, wherein each distribution template in the sequence of distribution templates comprises a unique ordered list of entries that identify distribution targets of the set of distribution targets that run on the storage server nodes, wherein the unique ordered list of entries for each distribution template comprises at least one entry for each distribution target of the set of distribution targets that run on the storage server nodes, and such that the unique ordered list of entries for each distribution template in the sequence of distribution templates is uniquely different from the unique ordered list of entries of other distribution templates in the sequence of distribution templates; and utilizing the sequence of distribution templates to map the distribution items associated with the logical address space of the given storage volume to the distribution targets that run on the storage server nodes such that each distribution target handles I/O operations associated with a group of distribution items that are mapped to that distribution target; and in response to receiving a given data access request for the given storage volume, utilizing the mapping metadata to identify one or more distribution items associated with the given data access request, and to distribute the one or more identified distribution items to respective distribution targets to which the one or more distribution items are mapped, for performing I/O operations associated with the one or more distribution items.

11. The article of manufacture of claim 10, wherein the program code for mapping the logical address space of the given storage volume to the sequence of distribution templates, comprises program code for:

grouping the distribution items that are mapped to distribution targets by a given distribution template into an item group; and mapping the item group to the given distribution template by a unique template identifier of the given distribution template.

12. The article of manufacture of claim 10, wherein the distribution templates in the sequence of distribution templates are selected from a set of distribution templates having a fixed number of uniquely different distribution templates having the respective unique ordered list of entries that identify distribution targets of the set of distribution targets.

13. The article of manufacture of claim 12, wherein the respective unique ordered list of entries of each distribution template in the set of distribution templates comprises a fixed number of entries of distribution targets, wherein the fixed number of entries of distribution targets is greater than a total number of distribution targets on the storage server nodes.

14. The article of manufacture of claim 13, wherein the program code for managing the distribution of the I/O workload among the storage server nodes further comprises program code for:

scaling the data storage system to include additional storage server nodes;

provisioning additional distribution targets on the additional storage server nodes; and creating new distribution templates in place of existing distribution templates of the set of distribution templates to include the additional distribution targets without permanently increasing the fixed number of entries of distribution targets of the distribution templates.

15. The article of manufacture of claim 14, wherein the program code for creating new distribution templates in place of existing distribution templates of the set of distribution templates to include the additional distribution targets comprises program code for:

scanning the existing distribution templates of the set of distribution templates to select template entries to be replaced with the additional distribution targets;

incorporating the additional distribution targets into the selected template entries of the existing distribution templates of the set of distribution templates to generate new distribution templates from the existing distribution templates of the set of distribution templates; and performing a data migration process to migrate data by moving distribution items associated with the data to corresponding distribution targets, based on the new distribution templates.

16. The article of manufacture of claim 12, wherein the unique ordered list of entries of a given distribution template comprises multiple sequentially repeated instances of a same unique sequential order of the distribution targets.

17. The article of manufacture of claim 12, wherein the program code for managing the distribution of the I/O workload among the storage server nodes further comprises program code for:

scaling the data storage system to include additional storage server nodes; and moving at least a portion of the distribution targets on the storage server nodes to the additional storage server nodes, without adding additional distribution targets to the additional storage server nodes, and without updating the distribution templates of the set of distribution templates.

18. A storage system, comprising:

storage server nodes and storage nodes, wherein each storage server node comprises one or more distribution targets that run on the storage server node, wherein each distribution target comprises a logical processing unit that is configured to manage input/output (I/O) operations for accessing data in the storage nodes; and a load distribution management system which is configured to manage a distribution of an I/O workload comprising I/O operations among the storage server nodes of the storage system;

wherein in managing the distribution of the I/O workload among the storage server nodes, the load distribution management system is configured to:

generate mapping metadata which maps a logical address space of a given storage volume to a set of distribution targets that run on the storage server nodes, wherein in generating the mapping metadata, the load distribution management system is configured to:

partition the logical address space of the given storage volume into a plurality of distribution items, each distribution item being associated with a corresponding block of logical addresses of the logical address space of the given storage volume;

map the logical address space of the given storage volume to a sequence of distribution templates, wherein each distribution template in the sequence of distribution templates comprises a respective unique ordered list of entries that identify distribution targets of the set of distribution targets that run on the storage server nodes, wherein the respective unique ordered list of entries for each distribution template comprises at least one entry for each distribution target of the set of distribution targets that run on the storage server nodes, and such that the respective unique ordered list of entries for each distribution template in the sequence of distribution templates is uniquely different from the respective unique ordered list of entries of other distribution templates in the sequence of distribution templates; and utilize the sequence of distribution templates to map the distribution items associated with the logical address space of the given storage volume to the distribution targets that run on the storage server nodes such that each distribution target handles I/O operations associated with a group of distribution items that are mapped to that distribution target; and in response to receiving a given data access request for the given storage volume, utilize the mapping metadata to identify one or more distribution items associated with the given data access request, and to distribute the one or more identified distribution items to respective distribution targets to which the one or more distribution items are mapped, for performing I/O operations associated with the one or more distribution items.

19. The storage system of claim 18, wherein:

the distribution templates in the sequence of distribution templates are selected from a set of distribution templates having a fixed number of uniquely different distribution templates having the respective unique ordered list of entries that identify distribution targets of the set of distribution targets;

the respective unique ordered list of entries of each distribution template in the set of distribution templates comprises a fixed number of entries of distribution targets, wherein the fixed number of entries of distribution targets is greater than a total number of distribution targets on the storage server node; and the unique ordered list of entries of a given distribution template comprises multiple sequentially repeated instances of a same unique sequential order of the distribution targets.

20. The storage system of claim 19, wherein the load distribution management system is further configured to:

scale the storage system to include additional storage server nodes; and one of (i) move at least a portion of the distribution targets on the storage server nodes to the additional storage server nodes, without adding additional distribution targets to the additional storage server nodes, and without updating the distribution templates of the set of distribution templates, and (ii) provision additional distribution targets on the additional storage server nodes, and create new distribution templates in place of existing distribution templates of the set of distribution templates to include the additional distribution targets without permanently increasing the fixed number of entries of distribution targets of the distribution templates.

* * * * *